(12) United States Patent
Naparstek et al.

(10) Patent No.: US 8,249,244 B2
(45) Date of Patent: Aug. 21, 2012

(54) SYSTEM AND METHOD FOR RECORDING AND DISTRIBUTING CUSTOMER INTERACTIONS

(75) Inventors: Jacob Naparstek, Ra'anana (IL); Leon Portman, Rishon Lezion (IL)

(73) Assignee: Nice Systems Ltd., Raanana (IL)

( * ) Notice: Subject to any disclaimer, the term of this patent is extended or adjusted under 35 U.S.C. 154(b) by 835 days.

(21) Appl. No.: 12/400,483

(22) Filed: Mar. 9, 2009

(65) Prior Publication Data

US 2010/0226482 A1 Sep. 9, 2010

(51) Int. Cl.
- H04M 1/64 (2006.01)
- H04K 1/00 (2006.01)
- G07C 1/00 (2006.01)
- G06F 15/16 (2006.01)

(52) U.S. Cl. .. 379/265.05; 379/68; 379/85; 379/265.02; 379/265.11; 379/309; 380/283; 455/518; 705/39; 709/206

(58) Field of Classification Search .................... 379/68, 379/69, 85, 88.22, 88.24, 88.25, 265.02, 379/265.09, 309, 265.03, 265.05, 265.06, 379/265.07, 265.11; 380/283; 455/518; 709/206; 705/39

See application file for complete search history.

(56) References Cited

U.S. PATENT DOCUMENTS

| | | | | |
|---|---|---|---|---|
| 5,533,103 A * | 7/1996 | Peavey et al. | ................... | 379/69 |
| 5,535,256 A * | 7/1996 | Maloney et al. | ............. | 379/309 |
| 5,544,231 A * | 8/1996 | Cho | .......................... | 379/88.24 |
| 5,923,746 A * | 7/1999 | Baker et al. | .............. | 379/265.02 |
| 6,072,860 A * | 6/2000 | Kek et al. | .................. | 379/88.25 |
| 6,222,909 B1 * | 4/2001 | Qua et al. | ................... | 379/88.22 |
| 6,529,602 B1 * | 3/2003 | Walker et al. | ................. | 380/283 |
| 6,600,821 B1 * | 7/2003 | Chan et al. | ............... | 379/265.07 |
| 6,868,141 B2 * | 3/2005 | Mateu | ............................ | 379/85 |
| 6,914,975 B2 * | 7/2005 | Koehler et al. | .......... | 379/265.05 |
| 6,999,943 B1 * | 2/2006 | Johnson et al. | ................. | 705/39 |
| 7,023,979 B1 * | 4/2006 | Wu et al. | .................. | 379/265.11 |
| 7,110,525 B1 * | 9/2006 | Heller et al. | ............. | 379/265.11 |
| 7,409,054 B2 * | 8/2008 | Galvin | ..................... | 379/265.03 |
| 7,502,448 B1 * | 3/2009 | Elman et al. | .................... | 379/68 |
| 7,809,388 B1 * | 10/2010 | Othmer | ........................ | 455/518 |
| 7,953,219 B2 * | 5/2011 | Freedman et al. | ........ | 379/265.06 |
| 7,991,128 B2 * | 8/2011 | Abernethy et al. | ......... | 379/88.24 |
| 8,054,954 B1 * | 11/2011 | Abraham et al. | .......... | 379/88.22 |
| 8,130,913 B1 * | 3/2012 | Panchbudhe et al. | ........... | 379/68 |
| 8,161,116 B2 * | 4/2012 | Chaddha et al. | .............. | 709/206 |
| 2010/0226482 A1 * | 9/2010 | Naparstek et al. | .............. | 379/85 |

* cited by examiner

Primary Examiner — Gerald Gauthier
(74) Attorney, Agent, or Firm — Pearl Cohen Zedek Latzer, LLP

(57) ABSTRACT

A system and method for recording and distributing calls are provided. A call may be associated with an information record. Parameters in the information record may be used to determine if the call is to be recorded. Parameters in the information record may be used to determine a method of providing a recording of the call. Other embodiments are described and claimed.

6 Claims, 4 Drawing Sheets

SYSTEM AND METHOD FOR RECORDING AND DISTRIBUTING CUSTOMER INTERACTIONS

BACKGROUND

Recording has become a key feature of modern interaction-related environments and/or systems. For example, systems used for operating call centers, banks, academic institutions, government agencies, health care facilities and/or web based shopping may all comprise some form of recording capacities and/or systems. Interactions involving customers, clients, constituents or any other users associated with various respective industries, organizations and companies may all be recorded or may be selectively recorded according to various criteria. Recording of calls or sessions may be mandatory for some organizations, used as voice receipt or used for tracking, logging or other purposes.

Recording of customer interactions or calls may be performed by the customer or caller. For example, a computer application may record calls made by a caller using an internet protocol (IP) phone or built-in recorders in a telephone device may record calls. Additionally, telephony vendors or carriers may record telephone calls. However, such solutions may not be available or feasible for various scenarios as they may require installation of additional hardware or software and/or may not provide a solution that is customer centric rather than device or infrastructure centric.

Alternatively, calls may be recorded by an organization associated with the call. However, recording of interactions or calls performed by an organization comprises storing the recorded calls or interactions on devices that are typically internal to the organization or enterprise associated with the interaction. Accordingly, recorded information is only readily available to personnel or other entities of the organization but not to the customer, caller or other, external to the organization, entities.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
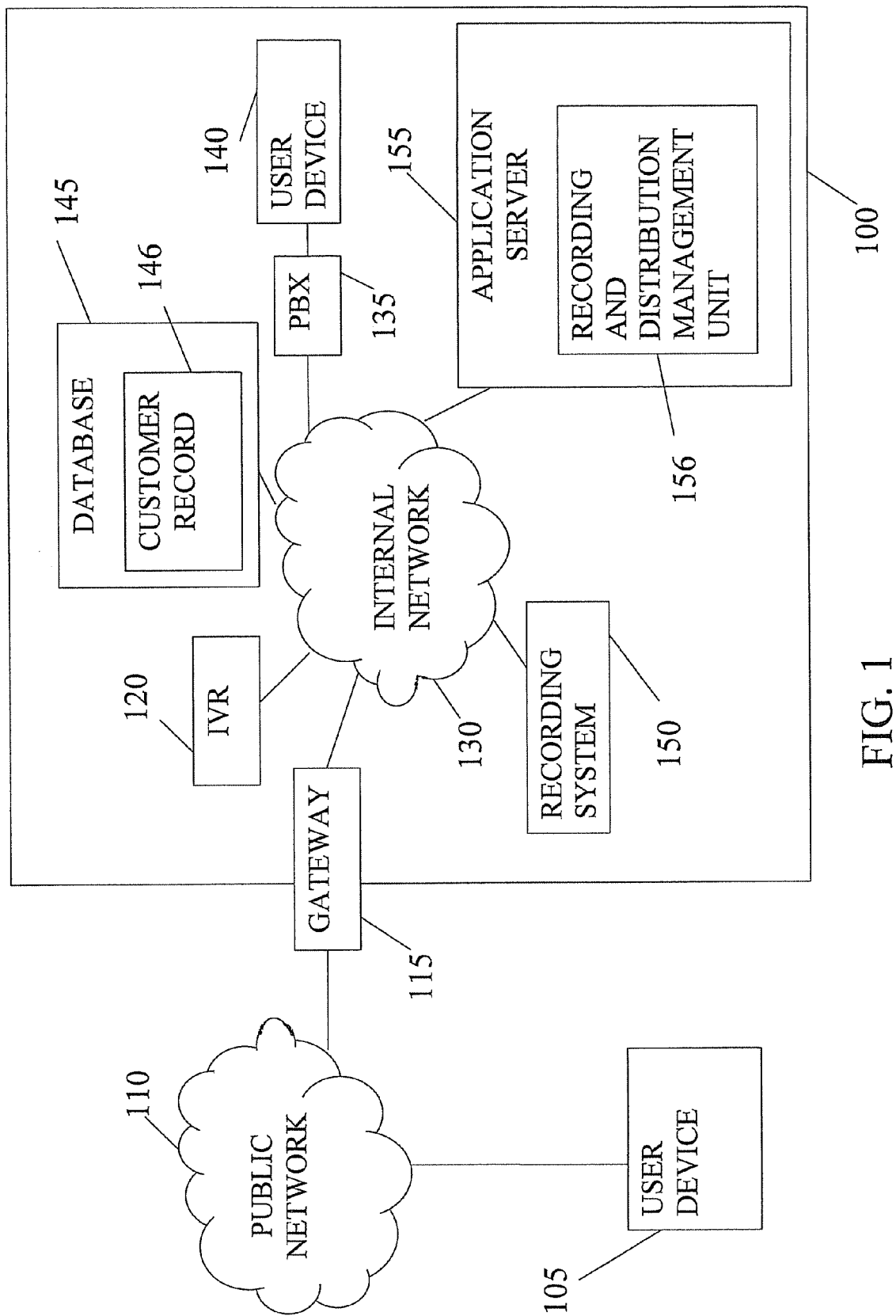
FIG. 1 shows a high-level diagram of an exemplary interaction related environment according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed at the same point in time.

Reference is made to FIG. 1 depicting a high-level diagram of an exemplary interaction related environment according to embodiments of the invention. According to embodiments of the invention, system 100 and its components may be internal to an organization and accordingly maintained by the organization. Gateway 115 may be any suitable device enabling communication of information from system 100 devices to devices, humans or entities external to the organization. Internal network 130 may be any suitable network enabling components of system 100 to interact and further enabling communicating, e.g., via gateway 115, with entities external to the organization. For example, internal network 130 may be a private internet protocol (IP) network, a switched telephone network or any other suitable telephone network or it may be a local area network (LAN). Integrated voice response (IVR) 120 may be an IVR system as known in the art and may interact with a caller. For example, IVR 120 may enable a caller to interact with system 100 by providing a multiple-choice list of operations or options to a customer or caller.

It will be noted that although a session enabling two or more humans or other entities (e.g., a human caller and an IVR application) to communicate will typically be referred to hereinafter as a call, the term "call" should be expansively and broadly construed to include any applicable session or interaction. For example, a call may be a telephone call carried over a telephone network and/or over a packet based network or it may be a web session comprising audio and video information being communicated between the parties of the session or call, e.g., when a user or customer interacts with an organization using a web browser to logon to a web site. Other interactions relevant to the present invention may be or may comprise electronic mail (email) correspondence, internet chat applications and the like. Any such interaction may be recorded and a recording of such interaction may be provided to one or more parties of the interaction as described herein.

Accordingly, recording a call may comprise recording any applicable information, e.g., audio and video. It will further be noted that although a caller will typically be referred to as a customer or client, it should be understood that the caller may be any applicable entity, e.g., a student communicating with an academic institution, a constituent communicating with a government agency or a user of a service communicating with a service provider or a call center providing services to, or acting as a front end for, a busyness, company, institution or any other applicable organization.

Private branch exchange (PBX) 135 may be any suitable PBX as known in the art and may forward calls or sessions to an agent station or device. For example, PBX 130 may forward calls to user device 140. User device 140 may be any suitable device, e.g., a telephone used by, for example, agents in a call center or in any other applicable facility, e.g., agents in a bank or personnel in a government agency. Database 145 may be any database system, device and/or application that stores relevant information. For example, database 145 may be a customer relation management (CRM) and may store customers information or parameters. Database 145 may provide such parameters and information to any applicable component of system 100. Recording system 150 may be any recording system, device and/or application capable of recording calls, sessions or any applicable information related to activities and/or operations of system 100. For example, Recording system 150 may be or comprise components of the NICE Perform® system as known in the art. Accordingly, calls made by customers, clients and/or employees of an organization may be recorded by recording system 150. Application server 155 may store and/or execute any application related to operations or other aspects of system 100. As shown, devices, systems and applications comprised in system 100 may interact over network 130.

Network 110 may be a public switched telephone network (PSTN), or any other suitable telephone network. Alternatively or additionally, network 110 may be a local area network (LAN), a private IP network or a public IP network, e.g., the Internet. Network 110 may comprise an integrated services digital network (ISDN) lines, T1/E1 lines and support, DS1 and/or DS3 lines and support, support for Asynchronous Transfer Mode (ATM) communications, frame relay connections, metropolitan area network (MAN), a wide area network (WAN), a global computer network such as the internet, a wireline or wireless network, a local, regional, or global communication network, an enterprise intranet, other suitable communication link, or any combination of the preceding. Gateway 115 may perform any required operations needed for enabling devices connected to network 110 to interact with devices connected to internal network 130. User device 105 may be any suitable device that may be used by a customer, caller or any person calling or otherwise contacting system 100. For example, user device 105 may be a telephone, a cellular phone, a wireless device or a computing device capable of communicating with system 100 over network 110.

Recording and distribution management unit 156 (hereinafter "management unit 156") may be installed and executed on application server 155 or it may be part of recording system 150 or may be installed and executed on any suitable computing device. Management unit 156 may be or may comprise a computing device, chip, application specific integrated circuit (ASIC) and may be or may comprise software, hardware, firmware or any combination thereof. Management unit 156 may administer, control, supervise or otherwise manage any aspects of recording calls and distributing recordings of calls or other interactions with system 100 as described herein. Customer record 146 may be or may comprise any applicable information record, parameter or object and may comprise any relevant or applicable customer, client or other caller's information. For example, customer record 146 may be a customer profile or database entry or any other suitable information object. Customer record 146 may be used by management unit 156 as described herein. It will be recognized that although a single exemplary customer record 146 is shown, any number of such records may be maintained by system 100. It will further be recognized that embodiments of the invention are not limited by the type, number or other aspects of IVR 120, database 145, PBX 135, user devices 140 and 105, application server 155, recording system 150, gateway 115 and networks 130 and 110. Any applicable alterations, modifications, or replacements may be made to these components without departing from the scope of the invention.

According to embodiments of the invention, management unit 156 may be notified upon establishment of a call or session with a customer. Management unit 156 may be further provided with one or more parameters related to the call. For example, the telephone number associated with the call may be provided, or the telephone number dialed by a customer may be provided to management unit 156, e.g., using dialed number identification service (DMS) or parameters such as an automatic number identification (ANI) or automatic location identification (ALI) may be provided to management unit 156. Another exemplary parameter that may be provided in relation to a call may be a private identification number (PIN). As known in the art, a PIN may be a code, password or any other applicable parameter provided by an organization to a customer, for example, upon registration for a specific service. A PIN may further be subsequently used by the customer when calling, or interacting with the organization and may uniquely identify the caller.

Such or other parameters may be used to associate a call with a specific customer and further obtain information related to the customer as described herein. For example, customer record 146 may comprise any applicable parameter such as ANI, ALI or DNIS related information or PIN described herein. Accordingly, based on a parameter identifying the customer, database 145 may be queried or searched and a matching customer record may be retrieved. According to embodiments of the invention, management unit 156 may examine a customer record 146 and determine if the call is to be recorded.

According to embodiments of the invention, an entry in customer record 146 may indicate that calls associated with the customer are to be recorded. Accordingly, management unit 156 may determine whether the call is to be recorded based on information in customer record 146. If determined that a recording is to be performed, management unit 156 may instruct recording server to record the call. Management unit 156 or any other relevant application or system may further perform any required operations needed to enable a recording of the call, for example, routing of the call to recording system 150. Possibly upon termination of the call, management unit 156 may examine customer record 146 in order to determine if a recording of the call is to be delivered to the caller. Customer record 146 may comprise an entry indicating if delivery of recorded calls to the caller is to be performed.

Accordingly, management unit 156 may examine customer record 146 and determine, based on information therein if forwarding, sending or otherwise providing a recording of the call to the caller is to be performed.

If determined that a recording of the call is to be provided to the caller, management unit 156 or another application may retrieve a recording of the call, for example, from recording system 150 or from any storage or system, and may provide the recording to the caller. Providing of a recording of the call may be performed in one of a number of methods. For example, a recording of a call may be sent to the caller using electronic mail (email) or it may be uploaded to a predefined internet or other site, e.g., a web site. Customer record 146 may comprise information indicating a preferred method of delivery of a recording of a call to the caller. Accordingly, management unit 156 may examine the customer record and determine the method by which a recording of a call is to be provided to the caller. Management unit 156 may cause a recording of a call to be provided to the associated caller based on information in the relevant customer record. Regardless of the way or means a recording of a call or session is provided, various limitations may be enforced. For example, a recording may be available for a limited period of time. For example, a recording of a call may be uploaded to a web site but removed from such web site after a predefined number of days, e.g., a week or a month. Similarly, a recording of a call stored internally, e.g., on a server within an organization associated with the call may be removed from storage after a predefined period of time has elapsed. Other applicable criteria or constraints may be involved in determining how long a recording is kept and/or is available. For example, storage capacity constraints may determine a time when a recording may no longer be available. Accordingly, possibly upon storing a recording of a call, management unit 156 may update an expiration list that may be used to remove stored recordings of calls. For example, management unit 156 or another unit (not shown) may periodically examine such expiration list and remove recorded calls according to the list.

Figure 2:
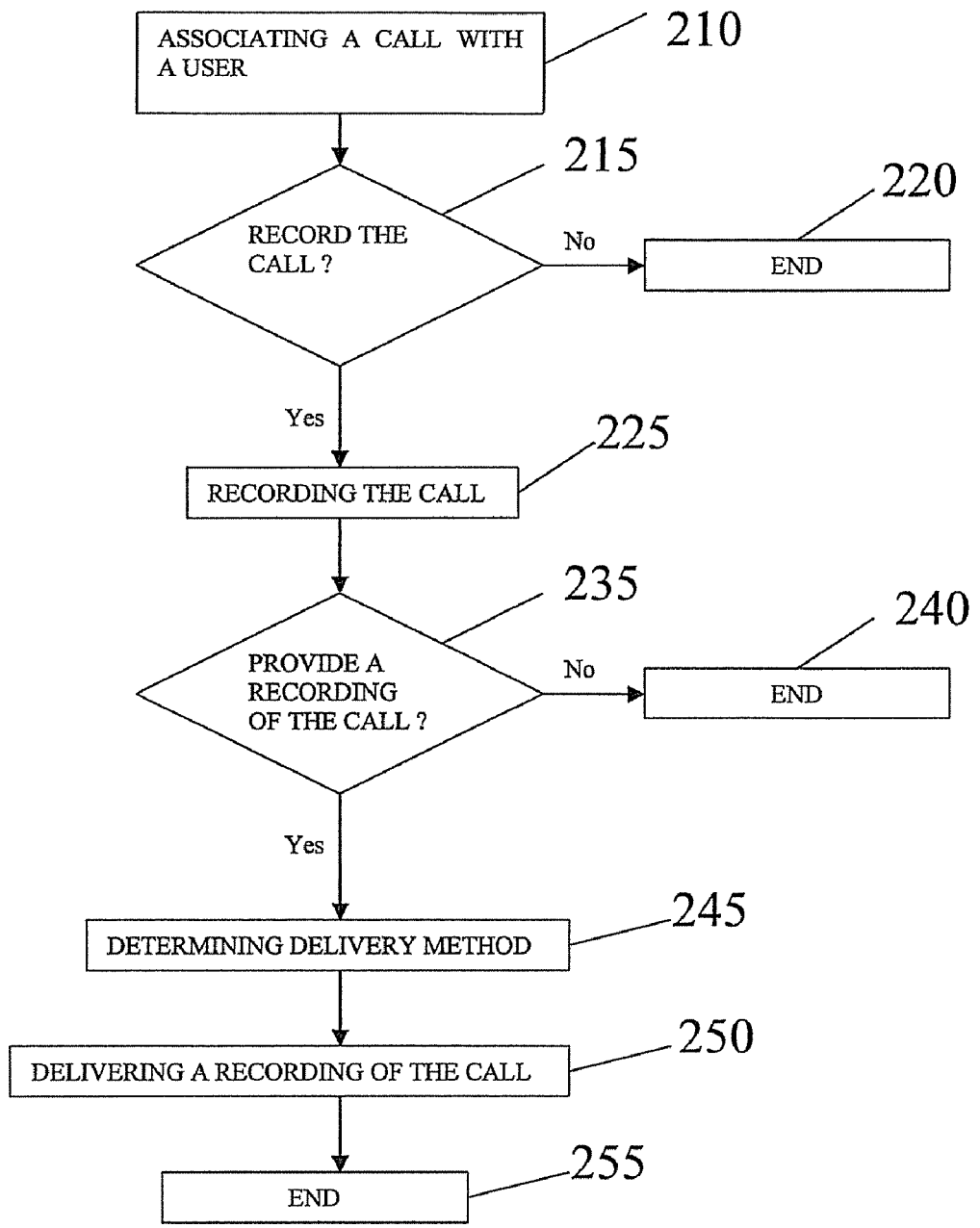
FIG. 2 is a flowchart diagram illustrating an exemplary flow according to some embodiments of the present invention.

Reference is made to FIG. 2, showing a flowchart diagram illustrating an exemplary flow according to some embodiments of the present invention. As shown by block 210, the flow may include associating a call with a user or caller information object. It will be recognized that the call may be an incoming call, e.g., a call initiated by a customer or client of a busyness organization, a call made by a student to an academic institution or a call made by any person to a call center. Alternatively, the call may be an outgoing call, e.g., a call made or initiated by an agent in a bank to a client or customer of the bank. Associating a call with a customer may be performed after the call has been established, e.g., the caller has begun speaking with an agent or interacting with one of the components of system 100, e.g., interacting with IVR 120. Alternatively, a call may be associated with a caller prior to an establishment of the call. Associating a call with a user, client, customer or any other entity may comprise associating the call with an information record, e.g., a customer record such as customer record 146.

For example, upon detecting that an incoming or outgoing call is initiated, possibly prior to being established, parameters or information such as ANI, ALI or other parameters that may already be available may be used in order to associate the relevant party, e.g., the person, establishment or other entity being called (outgoing call) or the person, establishment or entity calling the organization comprising system 100. For example, if the call is an outgoing call and the parameter used for associating the call with a customer is the telephone number then a number of functionalities shown by the flow in FIG. 2 may be performed prior to actual establishment of the call. Likewise, upon detection of an incoming call, for example, by IVR 120 or gateway 115, parameters related to the incoming call may be extracted and used for associating the incoming call with a customer prior to an actual establishment of the call.

In some embodiments, information pertaining to a customer, or an information record or object may be extracted from systems such as a customer relation management (CRM) system or any other system, device or application storing, maintaining or otherwise capable of providing such information. In other embodiments, information used for associating a caller with a call may be provided by the caller. For example, a caller may provide any indication or information required in order to associate the caller with an information record or object or a customer record as described herein. For example, a caller may verbally request to be provided with a recording of a call and may further provide required information, e.g., a password or secret code to an agent in a call center, the agent may interact with management unit 156 and provide it the code received from the caller. Alternatively, a caller may interact with an IVR system, e.g., IVR 120, and provide a private identification number (PIN) or other password or code to the IVR system. The IVR system may further provide such code to a relevant component of system 100, e.g., management unit 156 as described herein.

As shown by block 215, a decision if the call is to be recorded may be made. According to embodiments of the invention, a customer record (e.g., as shown by 146 in FIG. 1) may comprise an indication or parameter upon which such decision may be based. For example, one of the fields in customer record 146 may be, for example, a boolean value field that may be set to one of two values, e.g., "1" or "0", or "YES" or "NO" thus indicating whether calls from the associated customer are to be recorded or not. Accordingly, determining if a recording is to be performed may comprise examining such field in a customer record. As shown by block 220, if it is determined that the call is not to be recorded, the flow may terminate.

As shown by block 225, possibly subsequent to determining that the call is to be recorded, the call may be recorded. For example, management unit 156 may cause recording system 150 to record the call. Management unit 156 may further provide recording system 150 with an identifier that may be subsequently used, possibly by management unit 156, in order to locate, identify and/or retrieve the recording. Parameters or information provided to recording system 150 may comprise, for example, information or parameters associating the call with the user, or identifiers that may be stored by server and subsequently used for locating the recording. For example, management unit 156 may generate an identifier in association with the call and user, provide the identifier to recording system 150 and use the identifier to retrieve a recording of the call at a later stage.

As shown by block 235, the flow may comprise determining if a recording of the call is to be provided to the caller. For example, a customer record (e.g., as shown by 146 in FIG. 1) may comprise an indication or parameter upon which such decision may be based. For example, one of the fields in customer record 146 may indicate the recorded calls associated with the caller are to be provided to the caller. Accordingly, management unit 156 may examine the customer record, and determine that a recording of the call is to be delivered or otherwise provided to the caller. As shown by block 240, if it is determined that a recording of the call is not to be provided, the flow may terminate.

According to some embodiments of the invention, a recording of a call may be provided upon request. For example, after a call has been recorded as described herein, a customer may call an organization and inform an agent he or she wishes to listen to a recording of a previous call over the telephone, the customer may further provide the agent with an identification parameter as described herein. The agent may locate the recording based on the supplied parameter and other details, e.g., time and date the recorded call was made. For example, recording server may enable searching for recorded items based on identification parameters, date and time parameters or any applicable parameters. Having located a recording of the call, the agent may cause recording of the call to be played over the telephone thus enabling the customer to hear it. Alternatively, the agent may provide the identification parameter and any other relevant parameters, e.g., time and date of the call, to an application such as management unit 156 that may locate the recording, for example on recording system 150, based on the identification parameter and cause recording server to replay the recording over the call or otherwise enable a user to hear a recording of the call, for example, over a telephone. In other embodiments, an IVR system, e.g., IVR 120 may perform functionalities similar to those described above, e.g., receive an identification number of a customer and date and time parameters pertaining to a recorded call and provide, over a telephone, a replay of a recoded call.

As shown by block 245, the flow may comprise determining a method by which a recording of a call will be provided to the caller. For example, a customer record (e.g., as shown by 146 in FIG. 1) may comprise an indication or parameter upon which such decision may be based. For example, one of the fields or entries in customer record 146 may indicate that recorded calls associated with the caller are to be provided to the caller as an attachment to an electronic mail (email) or by uploading a recording of the call to a predefined Internet site. Recording of calls uploaded to an Internet site or any other applicable server may be accessed and/or downloaded by the caller by providing a password or other code that may be previously provided to the caller. For example, a customer may register with an organization employing an embodiment of the invention, e.g., system 100. Registration may comprise a service that comprises providing recordings of calls made bay the customer to the organization or made by the organization to the caller. The registration process may comprise obtaining information from the customer, e.g., whether the customer wishes to have recordings of calls delivered, the method of delivery. The registration process may comprise providing an access code, parameter or any other applicable information that may be used by the customer in the process of obtaining call recordings.

According to embodiments of the invention, rather than actively providing a recording of a call to a caller, the caller may retrieve a recording. For example, a parameter, password or code provided to a customer as described herein may be used by the customer to retrieve his call by calling the organization and providing the provided code to an IVR system or application, e.g., IVR 120 in FIG. 1. An IVR system may use such code to locate the relevant recording on a recording server, e.g., recording system 150. Accordingly, upon initiating a recording as described herein, management unit 156 may provide such code (extracted from the relevant customer record) to recording system 150. Recording system 150 may associate the code with the recording and may, at a later stage, locate the recording according to the associated code. Accordingly, IVR 120 may receive an access code from a customer and use such received code to locate a recording of an interaction between the customer and the organization on system 150.

As shown by block 250, the flow may comprise delivering a recording of the call to the caller. For example, management unit 156 may cause a mail application (not shown) that may be installed on application server to send an electronic mail (email) the caller and attach a recording of the call to the email. Any information required for delivering a recording of a call to a caller may be stored in customer record 146. For example, an email address to which recording of calls are to be sent may be extracted in customer record 146 and accordingly extracted by management unit 156 and provided to an electronic mail application or server to be used as the destination address of the email. As shown by block 255, the flow may terminate after a recording of the call has been provided to the caller.

In contrast with existing solutions for recording calls, e.g., client side recording, the present invention provides a solution whereby a recording of calls may be performed by the organization associated with the call in a secure way and possibly by systems that are internal to the organization. Embodiments of the invention may further enable a customer or caller to receive or otherwise obtain a recording of a call he or she made to the organization or received from the organization. According to embodiments of the invention, a recording of a call may be triggered or otherwise initiated in accordance with an identification of the caller rather than the device, method or infrastructure used. For example, following a registration for the service, a recording system in the associated organization may record a call from a customer and, according to predefined or configuration parameters, provide the customer or caller with a recording of the call.

It will be recognized that according to embodiments of the invention, the actual recording of a call may be performed in any applicable way as known in the art. For example, any suitable recording server, platform or system, e.g., NICE Perform® from NICE Ltd of ra'anana Israel may be used to record a call once a decision to record the call has been made. Embodiments of the invention are not limited by the type, nature or other aspects of the recording system used for recording calls as described herein. Among other aspects of a call, embodiments of the invention may specifically apply to determining if a call is to be recorded, collecting call related information, processing recorded information and distributing recorded information to callers.

Various methods or flows for recording calls and distributing recording of calls may be possible according to embodiments of the invention. According to one embodiment, a caller may register for a "recording and distribution of calls" service with an organization or enterprise. For example, a bank's customer may securely logon to the bank's internet web site, e.g., by providing his social security number and his account number and may, e.g., by filling and submitting a proper form, register for a service that includes recording and distribution of calls. Alternatively, a customer may verbally request an agent in the organization or call center to perform such registration and may provide the agent with necessary details. Any applicable form of registration for a service as known in the art may be applicable to embodiments of the invention. Any information, configuration or other parameters or data applicable to a recording and distributing of calls may be obtained during a registration procedure, any information thus obtained may be stored, for example in a customer record described above and may further be used during a process of recording a call and/or distributing a recording of a call.

According to embodiments of the invention, information obtained from a registering customer and pertaining to aspects such as, but not limited to, determining if a call involving the registering customer is to be recorded, methods of distributing a recording of calls to the customer as well as any applicable aspects associated with recording and/or distributing recorded calls to the customer or other entities may be stored, for example in a dedicated or other customer record. A customer record may include any applicable information, configuration or other parameters, recording and/or distribution rules and/or criteria or any information applicable to aspects of recording and distributing calls.

For example, a rule in a customer record may be "only record calls made during working hours" or "only record calls made from a specific telephone number". Other examples may be a quality of the recording (that may effect the size of the file containing a recording provided to the customer) or excluding or including various information, e.g., include a screen recording of the agent's display screen. Other parameters, data or information included in a customer record may pertain to the distribution of recorded calls. For example, an electronic mail (email) address may be included in the customer record and may be used for mailing recordings of calls to the customer or to a designated address. Various constraints, rules or conditions related to a distribution of recordings of calls may be specified, e.g., "do not send files larger than 5 MB", "send recordings to a (provided) list of addresses", "do not attach any solicitation material to mailed recordings" etc.

A customer record as described herein may be stored on an internal database. For example, a CRM system internal to, and maintained by the organization may store a customer record described herein and provide it, or information included in it, for example, to a managing application, e.g., management unit 156.

Figure 3:
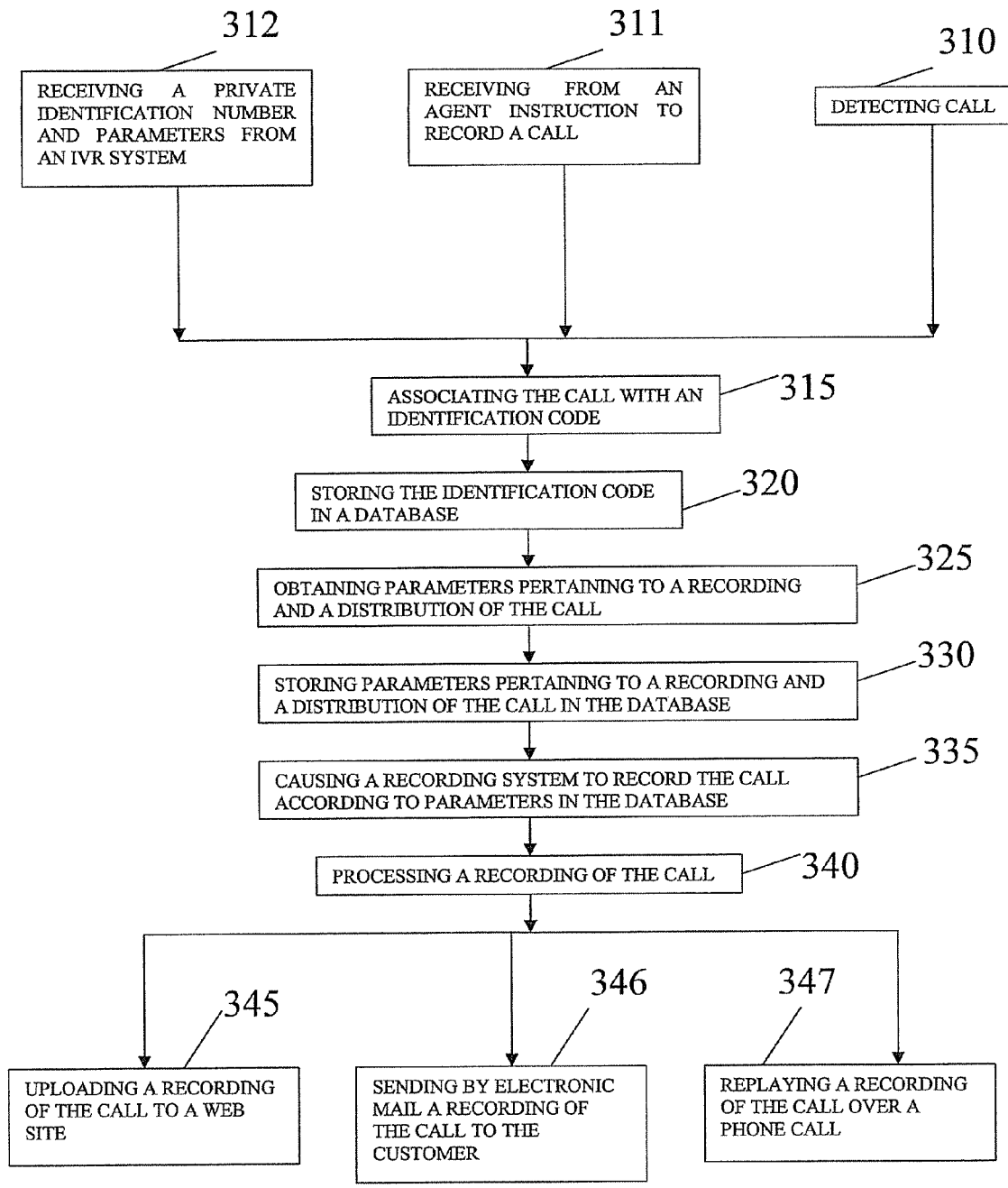
FIG. 3 is a flowchart diagram illustrating an exemplary flow according to some embodiments of the present invention.

Reference is made to FIG. 3, showing a flowchart diagram illustrating an exemplary flow according to some embodiments of the present invention. As shown by blocks 310, 311 and 312, a recording of a call and a distribution of the resulting recording may be triggered or initiated in various ways. As shown by block 310, possibly based on previously obtained information, e.g., during a registration of a customer for the service, recording and distributing recorded calls may be automatic. Accordingly, upon detecting a call from a caller or customer registered for the service, the flow or process may be initiated. For example, when a call between a customer and an agent is established or even only detected (e.g., the agent is calling the customer but the customer has not yet answered or picked up the phone) a CRM application may be notified. The CRM may issue a recording request to an application, e.g., management unit 156 of FIG. 1. The CRM may attach various parameters, e.g., extracted from a customer record described above, to a notification message sent to management unit 156. Any information included in a customer record as described herein may be attached or otherwise provided to a managing application, e.g., management unit 156, by the CRM system. For example, a distribution parameter list, e.g., email addresses may be provided, or a list of rules determining various aspects pertaining to a recording and/or distribution of the call may be provided.

As shown by block 311, the flow may be initiated as a result of an agent's action. For example, during a conversation between a caller and an agent, the caller may request or instruct the agent to initiate a recording. The caller may further provide various details pertaining to how he or she would like the recording to be performed and to how he or she would like to be provided with a recording of the call. For example, the caller may provide the agent with an email address to which a recording of the call is to be sent. Alternatively, the agent may provide the caller with a private identification number (PIN) that may be used to download or replay a recording of the call from a web site. Other options that may be offered to the caller may involve calling the organization, providing an IVR system with a code (that may be previously provided by the agent) and being provided with a replay of the call over a telephone.

As shown by block 312, a recording of a call and a distribution of the recording may be initiated by an IVR system. For example, a caller may be prompted by an IVR system to select if a recording of the call is to be performed. The caller may have previously registered for such service. Accordingly, recording and distributing of a recording may be performed according to information previously obtained from the caller and stored in the organization, e.g., in customer record 146 described herein. Alternatively, an IVR system may interact with an unregistered caller. The IVR system may enable the caller to cause a recording of the call, e.g., by a voice menu. The IVR may further generate or obtain a PIN and provide the PIN to the user. As described herein, a PIN may be used for downloading a recording from a web site, file transfer protocol (FTP) server or any other applicable system. Although only some exemplary ways by which the flow may be initiated, it will be noted that embodiments of the invention are not limited by the way the flow described herein is initiated.

As shown by block 315, an identification code identifying the call (and possibly associated caller and agent) may be generated. For example, a managing application, e.g., management unit 156 may generate an identification code and may further associate the identification code with the call and customer. As shown by block 320, the identification code may be stored in a database where it may be accessed or used as reference, e.g., a search key as known in the art, the identification code may be used by a number of components of system 100 when referring to the specific call. Accordingly, the identification code may be provided to all relevant components, e.g., a CRM system a recording system etc.

The managing application may provide a CRM system with such identification code thus establishing a reference point to the specific call and possibly associated caller and agent. Such reference may be used at later stages of the flow. The managing application may further store the identification code and any applicable information in a database (not shown in FIG. 1) that may be accessed at later stages as described herein. For example, such database may be a NICE Perform® database and may be accessed by a NICE CLS® recording application upon commencing a recording of the call.

As shown by block 325, parameters or other information pertaining to a recording and distribution of recordings may be obtained. For example, a managing application may retrieve any applicable information included in a customer record described herein, possibly stored in a CRM system. As shown by block 330, recording rules (and other information) may be stored in a database, possibly in association with the identification code described herein. Recording rules may be examined by a recording system, possibly prior to commencing a recording as described herein, any other applicable information may be stored in the database, e.g., by a managing application, for example, a distribution list as described herein. Such information may be accessed by a recording system, e.g., before a recording is started or by a CRM system performing a distribution of recordings of the call. The managing application may further store any applicable parameters, data or information in the database. For example, the call may be marked for distribution by the managing application and any information pertaining to a distribution of a recording of the call may be stored in the database. For example, the managing application may store a distribution list, e.g., a list of email addresses to be used for providing a recording and/or a distribution method.

As shown by block 335, a recording system may be caused to start recording the call. For example, management unit 156 may initiate a recording by causing recording system 150 to start a recording and providing it with a reference, e.g., the identification code, to a database. Accordingly, a recording system, e.g., a NICE CLS® in recording system 150, may access the database, and based on a provided identification code, retrieve any information pertaining to the recording process, e.g., a recording rule, and record the call according to the specified rule, criteria and/or other parameters stored therein.

Upon termination of a call, the managing application may be notified. For example, PBX 135 may be associated with the call and may notify management unit 156 that the call ended. The managing application may query various components of system 100, e.g., a NICE CLS® in recording system 150, loggers or other recording components or devices in order to retrieve any required information and/or locate data needed in order to enable providing a recording to the caller. For example, a managing application may interact with a recording management system, e.g., NICE CLS® in order to determine the specific loggers holding or storing a recording of the call. Any information or parameters required in order to interact with loggers or other components of a recording infrastructure may be retrieved or otherwise obtained by the managing application. Accordingly, the managing application may prepare one or more objects, e.g., files containing a recording of the call.

As shown by block 340, recorded information may be processed. For example, possibly prior to providing a recording of the call to the customer, a managing application may cause a filtering or other application to process the recorded call. For example, a filtering application may exclude any conversations or other interactions between agents inside the organization from the recorded data and possibly only leave a recording of the interaction between the agent and customer in the file or object that will be provided to the caller. Another example may be a removal of sensitive information. For example, word spotting may be used to search for and remove sensitive information, for example credit card information, e.g., credit card number, passwords and the like. Other than altering the actual content, e.g., by omitting or excluding sections any processing of the recorded data may be performed at this stage. For example, inserting data or metadata, e.g., bookmarks, time or duration information or parameters, or encrypting and/or compressing the recorded data. Following a locating and processing of the recorded data, the managing application may store the resulting data in a file or other object ready for delivery to the caller. For example, a playable file, e.g., in a format specified by the customer at the registration stage may be prepared.

Objects, e.g., files containing playable content such as voice or multimedia may be provided to the customer according to various flows, methods or means as shown by blocks 345, 346 and 347 described below. The actual providing of a recording of a call to a customer may be performed by any suitable component of system 100. For example, either management unit 156 or a CRM application (not shown) may perform the delivery of a recorded call to a customer. Accordingly, any information or parameters required by the component performing the delivery may be obtained from other components of the system, for example, in one embodiment, a managing application may perform the actual providing of the recording. Accordingly, possibly based on the identification code described herein, the managing application may retrieve from a CRM system an email address to be used for emailing a recording of the call to the customer.

As shown by block 345, a recording of the call may be uploaded to a web site or any suitable system. For example, a CRM system may be provided with a reference to the files containing a recording of the call and may further upload such files to a designated site or server. Such uploading may be according to information or parameters included in a customer record described herein. As shown by block 346, a recording of the call may be sent to the customer, e.g., as an attachment to an email. Any parameters or information required in order to email the recording to the customer may be found in and extracted from the relevant customer record. As shown by block 347, a recording of the call may be replayed, e.g., upon request from the customer. For example, a user may provide an IVR system with a previously obtained PIN or other identifying code and may further be provided by the IVR with an option to listen to a recording of a previous call over a telephone. In such case, the IVR system may convey the request of the customer to a managing application that may query a recording system in order to locate the files or objects containing the requested recording. The managing application may further examine the relevant customer record, e.g., in a CRM system and may perform the replay of the call according to any rules, parameters or other relevant information in the customer record. It will be noted that other than other systems or applications, either a managing application or a CRM application may perform a distribution of a recorded call by email, upload or replay as described herein. Accordingly, a managing application and a CRM system may exchange any relevant information in the process of distributing recorded calls.

Although only three methods of providing a recording of a call to a customer are described herein, embodiments of the invention are not limited in this respect. Any suitable way, method or means for locating a recording of the call, processing the content as described herein and providing the result to a customer may be used. It will be noted that prior to providing a recording of the call to the customer, the recording may be processed or manipulated as described herein with reference to block 340. Such processing and manipulation may comprise adding information. For example, an email to which a recording of a call is attached may further comprise advertisements or announcements from the sending organization, a replay of a recorded call may be preceded or followed by any voice content that may be attached or concatenated to the actual recording.

Figure 4:
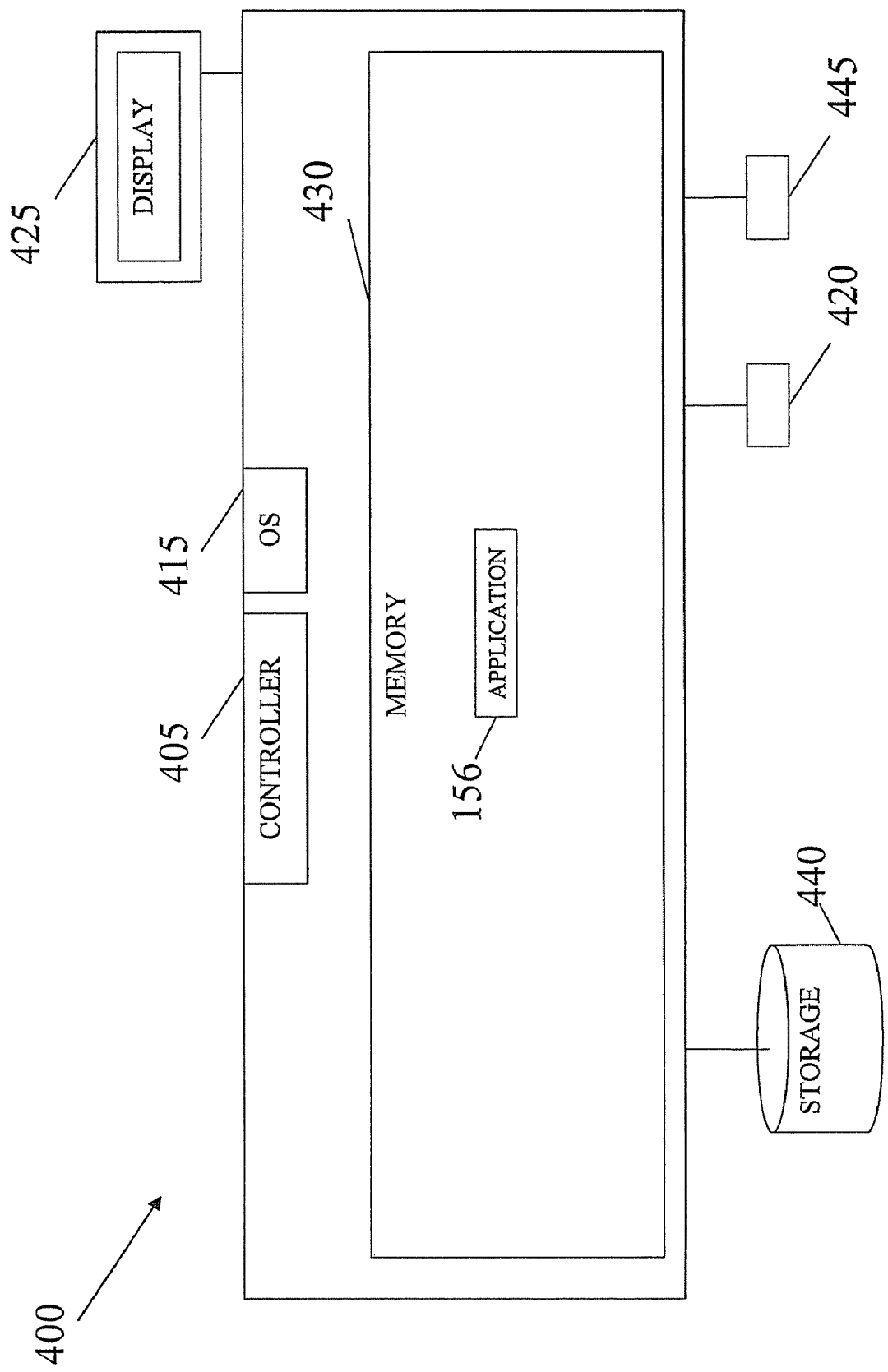
FIG. 4 shows a high level block diagram of an exemplary computing device according to embodiments of the present invention.

Reference is made to FIG. 4, showing high level block diagram of an exemplary computing device according to embodiments of the present invention. According to embodiments of the invention, gateway 115, recording system 150, IVR 120, database 145, application server 155 and/or user devices 140 and 105 may comprise all or some of the components comprised in computing device 400 as shown and described herein. According to embodiments of the invention, computing device 400 may include a memory 430, controller, e.g., central processing unit processor (CPU) 405, monitor or display 425, storage device 440, an operating system 415 and input device(s) 420 and output device(s) 445.

According to embodiments of the invention, storage device 440 may be any suitable storage device, e.g., a hard disk or a universal serial bus (USB) storage device, input devices 420 may include a mouse, a keyboard or any suitable input devices and output devices 445 may include one or more displays, speakers and/or any other suitable output devices. According to embodiments of the invention, various programs, applications, scripts or any executable code may be loaded into memory 430 and may further be executed by controller 405. For example, as shown, management unit 156 may be loaded into memory 430 and may be executed by controller 405 under operating system 415.

Some embodiments of the present invention may be implemented in software for execution by a processor-based system, for example, management unit 156. For example, embodiments of the invention may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), rewritable compact disk (CD-RW), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices. Other implementations of embodiments of the invention may comprise dedicated, custom, custom made or off the shelf hardware, firmware or a combination thereof.

Embodiments of the present invention may be realized by a system that may include components such as, but not limited to, a plurality of central processing units (CPU) or any other suitable multi-purpose or specific processors or controllers, a plurality of input units, a plurality of output units, a plurality of memory units, and a plurality of storage units. Such system may additionally include other suitable hardware components and/or software components.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method comprising:
receiving by an agent in a call center, a request from a customer to be provided with recording of interactions, said request indicating a method of providing the recording to the customer and received prior to establishment of the interactions;
storing the request at the call center;
detecting an interaction involving the customer and the call center;
locating the request at the call center;
recording the interaction at the call center; and
providing the customer with a recording of the interaction according to the method indicated in the request.

2. The method of claim 1, wherein the interaction is one of: an incoming call and an outgoing call.

3. The method of claim 1, wherein the method of providing the recording of the interaction is one of: sending the recording by an electronic mail, uploading the recording to a server and replaying the recording over a telephone upon request.

4. The method of claim 1, wherein locating a stored request is based on one of: a parameter received from the customer, a phone number, an automatic number identification (ANI) parameters, a dialed number identification service (DNIS) parameter and an automatic location identification (ALI) parameter.

5. The method of claim 1, wherein recording the interaction is performed by a recording server located inside the call center.

6. The method of claim 1, wherein requesting to be provided with a recording of the interaction comprises providing a predefined code to an application in the call center.

* * * * *